US008090704B2

(12) United States Patent
Archer et al.

(10) Patent No.: US 8,090,704 B2
(45) Date of Patent: Jan. 3, 2012

(54) DATABASE RETRIEVAL WITH A NON-UNIQUE KEY ON A PARALLEL COMPUTER SYSTEM

(75) Inventors: Charles Jens Archer, Rochester, MN (US); Amanda Peters, Rochester, MN (US); Gary Ross Ricard, Chatfield, MN (US); Albert Sidelnik, Urbana, IL (US); Brian Edward Smith, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 418 days.

(21) Appl. No.: 11/830,463

(22) Filed: Jul. 30, 2007

(65) Prior Publication Data
US 2009/0037377 A1 Feb. 5, 2009

(51) Int. Cl.
*G06F 17/30* (2006.01)
(52) U.S. Cl. ........ 707/708; 707/610; 707/640; 707/661; 707/674; 707/706; 707/713; 707/707; 707/709; 707/711; 707/712; 707/722; 707/736; 707/758; 707/781; 710/103; 710/62; 711/103
(58) Field of Classification Search .............. 707/3, 610, 707/640, 661, 674, 706, 713, 707, 709, 711, 707/712, 722, 736, 758, 781, 999.002, 999.003, 707/999.01; 710/103, 62; 711/103
See application file for complete search history.

(56) References Cited

U.S. PATENT DOCUMENTS

| | | | |
|---|---|---|---|
| 4,715,032 A | 12/1987 | Nilsson | |
| 5,083,265 A | 1/1992 | Valiant | |
| 5,513,371 A | 4/1996 | Cypher et al. | |
| 5,617,538 A | 4/1997 | Heller | |
| 5,721,828 A | 2/1998 | Frisch | |
| 5,794,229 A * | 8/1998 | French et al. | 707/2 |
| 5,822,604 A | 10/1998 | Ogasawara et al. | |
| 5,832,215 A | 11/1998 | Kato et al. | |
| 5,864,712 A | 1/1999 | Carmichael et al. | |
| 5,867,649 A | 2/1999 | Larson | |
| 5,878,241 A * | 3/1999 | Wilkinson et al. | 712/203 |
| 5,958,017 A | 9/1999 | Scott et al. | |
| 6,000,024 A | 12/1999 | Maddox | |
| 6,094,715 A * | 7/2000 | Wilkinson et al. | 712/20 |
| 6,182,061 B1 * | 1/2001 | Matsuzawa et al. | 707/2 |

(Continued)

FOREIGN PATENT DOCUMENTS
EP 1835414 A2 9/2007

OTHER PUBLICATIONS

Sunggu Lee et al., "Interleaved All-to-All Reliable Broadcast on Meshes and Hypercubes," IEEE Transactions on Parallel and Distributed Systems, vol. 5, No. 5, pp. 449-458, May 1994.

(Continued)

*Primary Examiner* — Syling Yen
(74) *Attorney, Agent, or Firm* — Martin & Associates, LLC; Bret J. Petersen

(57) ABSTRACT

An apparatus and method retrieves a database record from an in-memory database of a parallel computer system using a non-unique key. The parallel computer system performs a simultaneous search on each node of the computer system using the non-unique key and then utilizes a global combining network to combine the local results from the searches of each node to efficiently and quickly search the entire database.

18 Claims, 10 Drawing Sheets

U.S. PATENT DOCUMENTS

| | | | |
|---|---|---|---|
| 6,212,617 B1 | 4/2001 | Hardwick | |
| 6,292,822 B1 | 9/2001 | Hardwick | |
| 6,334,138 B1 | 12/2001 | Kureya | |
| 6,754,211 B1 | 6/2004 | Brown | |
| 6,914,606 B2 | 7/2005 | Amemiya et al. | |
| 2002/0016901 A1 | 2/2002 | Carvey et al. | |
| 2002/0095397 A1* | 7/2002 | Koskas | 707/1 |
| 2002/0095421 A1* | 7/2002 | Koskas | 707/100 |
| 2002/0144027 A1 | 10/2002 | Schmisseur | |
| 2003/0048785 A1 | 3/2003 | Calvignac et al. | |
| 2004/0034678 A1 | 2/2004 | Kuszmaul et al. | |
| 2004/0073590 A1* | 4/2004 | Bhanot et al. | 708/534 |
| 2004/0252547 A1* | 12/2004 | Wang | 365/154 |
| 2005/0094577 A1 | 5/2005 | Ashwood-Smith | |
| 2006/0161417 A1* | 7/2006 | Hardwick et al. | 703/22 |
| 2008/0271141 A1* | 10/2008 | Goldman et al. | 726/22 |

OTHER PUBLICATIONS

J. Bruck et al., "Efficient Algorithms for All-to-All Communications in Multiport Message-Passing Systems," IEEE Transactions on Parallel and Distributed Systems, vol. 8, No. 11, Nov. 1997.

S. Sistare et al., "Optimization of MPI Collectives on Clusters of Large-Scale SMPs," Conference on High Performance Networking and Computing, Proceedings of the 1999 ACM/IEEE Conference on Supercomputing, 1999.

A. Tannebaum, "Structured Computer Organization, Second Edition," Prentice-Hall, Inc, 1984.

J. Rosenberg, "Dictionary of Computers, Information Processing & Telecommunications, Second Edition," John Wiley & Sons, 1987.

R. Ladner et al., "Parallel Prefix Computation," Journal of the ACM (JACM), Oct. 1980, pp. 831-838, vol. 27, No. 4, Seattle, WA, USA.

W. Hills et al., "Data Parallel Algorithms," Communications of the ACM, Dec. 1986, pp. 1170-1183, vol. 29, No. 12, Cambridge, MA, USA.

Xian-He Sun et al., "A Massively Parallel Algorithm for Compact Finite Difference Schemes," 1994 International Conference on Parallel Processing, Aug. 1994, pp. 282-289, vol. 3, USA.

M. Herbordt, "Parallel Prefix and Reduction Algorithms Using Coterie Structures," preliminary version of some of this work appeared in the Proceedings of the 4th Conference on the Frontiers of Massively Parallel Computation, Oct. 19-21, 1992.

A. Fisher et al., "Computing the Hough Trandform on a Scan Line Array Processor," IEEE Transactions on Pattern Analysis and Machine Intelligence, vol. II, No. 3, Mar. 1989, pp. 262-265.

IBM and Lawrence Livermore National Laboratory, "An Overview of the BlueGene/L Supercomputer," 2002, IEEE, pp. 1-22.

* cited by examiner

Bitmask Query Example

| Node | # of Records | Matches Found | Bitmask 612 | Bitmask After Search |
|---|---|---|---|---|
| 0 | 4 | 2,3 | 0000 | 0110 |
| 1 | 2 | 1 | 00 | 10 |
| 2 | 6 | 4 | 000000 | 000100 |
| 3 | 1 | none | 0 | 0 |
| 4 | 2 | 2 | 00 | 01 |
| 5 | 5 | 3,5 | 00000 | 001010 |
| 6 | 3 | 1,2,3 | 000 | 111 |

Single Request Query Example – Integer Vector

1000

| Node | # of Records | Record Matches | Integer Vector (Before PP) | Integer Vector (After PP) |
|---|---|---|---|---|
| 0 | 4 | 2,3 | 2 0 0 0 0 0 0 | 2 0 0 0 0 0 0 |
| 1 | 2 | 1 | 0 1 0 0 0 0 0 | 2 3 0 0 0 0 0 |
| 2 | 6 | 4, 5, 6 | 0 0 3 0 0 0 0 | 2 3 6 0 0 0 0 |
| 3 | 1 | none | 0 0 0 0 0 0 0 | 2 3 6 6 0 0 0 |
| 4 | 2 | 1 | 0 0 0 0 1 0 0 | 2 3 6 6 7 0 0 |
| 5 | 5 | 3,5 | 0 0 0 0 0 2 0 | 2 3 6 6 7 9 0 |
| 6 | 3 | 1,2,3 | 0 0 0 0 0 0 3 | 2 3 6 6 7 9 12 |

1010
1012
1014

DATABASE RETRIEVAL WITH A NON-UNIQUE KEY ON A PARALLEL COMPUTER SYSTEM

RELATED APPLICATION

This application is related to patent application Ser. No. 11/737,209, to Charles J. Archer, et al., filed on Apr. 19, 2007, entitled "PARALLEL-PREFIX BROADCAST FOR A PARALLEL-PREFIX OPERATION ON A PARALLEL COMPUTER", which is herein incorporated by reference. This application is also related to patent application Ser. No. 11/830,387, to Charles J. Archer, et al., filed on even date herewith, entitled "DATABASE RETRIEVAL WITH A UNIQUE KEY SEARCH ON A PARALLEL COMPUTER SYSTEM", which is herein incorporated by reference.

BACKGROUND

1. Technical Field

This disclosure generally relates to a database on a parallel computer system, and more specifically relates to a method and apparatus for data retrieval with a non-unique key from an in-memory database in a parallel computer system.

2. Background Art

Databases are computerized information storage and retrieval systems. A database system is structured to accept commands to store, retrieve and delete data using, for example, high-level query languages such as the Structured Query Language (SQL). The term "query" denominates a set of commands for retrieving data from a stored database. The query language requires the return of a particular data set in response to a particular query. In a typical database structure, data is contained in a flat file partitioned into records or rows which are further partitioned into fields. A "key" is a string comprised of one or more fields from each record or row that can be used to retrieve information from the database using a query. Keys are generally stored in collated order in an "index" The index is searched for a leading substring of a key and, if that substring is found, the corresponding records/rows are the result. A unique key search is one where the search substring can, because of constraints on the data, only result in a single search result. Thus only one record/row can result. Similarly, a non-unique key is one that returns multiple records.

Databases and database queries are also used in computer systems with a large number of compute nodes. Massively parallel computer systems are one type of parallel computer system that have a large number of interconnected compute nodes. A family of such massively parallel computers is being developed by International Business Machines Corporation (IBM) under the name Blue Gene. The Blue Gene/L system is a scalable system in which the current maximum number of compute nodes is 65,536. The Blue Gene/L node consists of a single ASIC (application specific integrated circuit) with 2 CPUs and memory. The full computer is housed in 64 racks or cabinets with 32 node boards in each rack.

Computer systems such as Blue Gene have a large number of nodes, each with its own processor and memory. This characteristic provides the opportunity to provide an in-memory database, where some portions of the database, or the entire database resides completely in-memory. An in-memory database could provide an extremely fast response time for searches or queries of the database. In-memory databases pose new challenges and opportunities for computer databases administrators to utilize the full capability of an in-memory database. In particular, a parallel computer system such as Blue Gene has hardware that supports a global combining network that connects the nodes in a tree where each node has one or two children. The tree network has a built-in arithmetic logic unit (ALU) to perform reductions of data packets as they move along the network.

The prior art techniques for searching an in-memory database have not taken advantage of the network structures available in parallel computer systems such as Blue Gene. Without a way to effectively search an in-memory database, parallel computer systems will not be able to fully utilize the potential power of an in-memory database in a parallel computer system.

SUMMARY

A method and apparatus is disclosed to retrieve a database record from an in-memory database of a parallel computer system using a non-unique key. The parallel computer system performs a simultaneous search on each node of the computer system using the non-unique key and then utilizes a global combining network to combine the results from the searches of each node to efficiently and quickly search the entire database.

The disclosed examples herein are directed to a massively parallel computer system with multiple networks but the claims herein apply to any computer system with one or more networks and a number of parallel nodes.

The foregoing and other features and advantages will be apparent from the following more particular description, as illustrated in the accompanying drawings.

BRIEF DESCRIPTION OF DRAWINGS

The disclosure will be described in conjunction with the appended drawings, where like designations denote like elements, and.

DETAILED DESCRIPTION

A method and apparatus is disclosed to retrieve a database record from an in-memory database having a non-unique key on a parallel computer system. The parallel computer system performs a simultaneous search on each node of the computer system using the non-unique key and then utilizes a global combining network to combine the results from the searches of each node to efficiently and quickly search the entire database. The detailed description is given with respect to the Blue Gene/L massively parallel computer being developed by International Business Machines Corporation (IBM). However, those skilled in the art will appreciate that the mechanisms and apparatus of the disclosure and claims apply equally to any parallel computer system with multiple nodes and networks.

Figure 1:
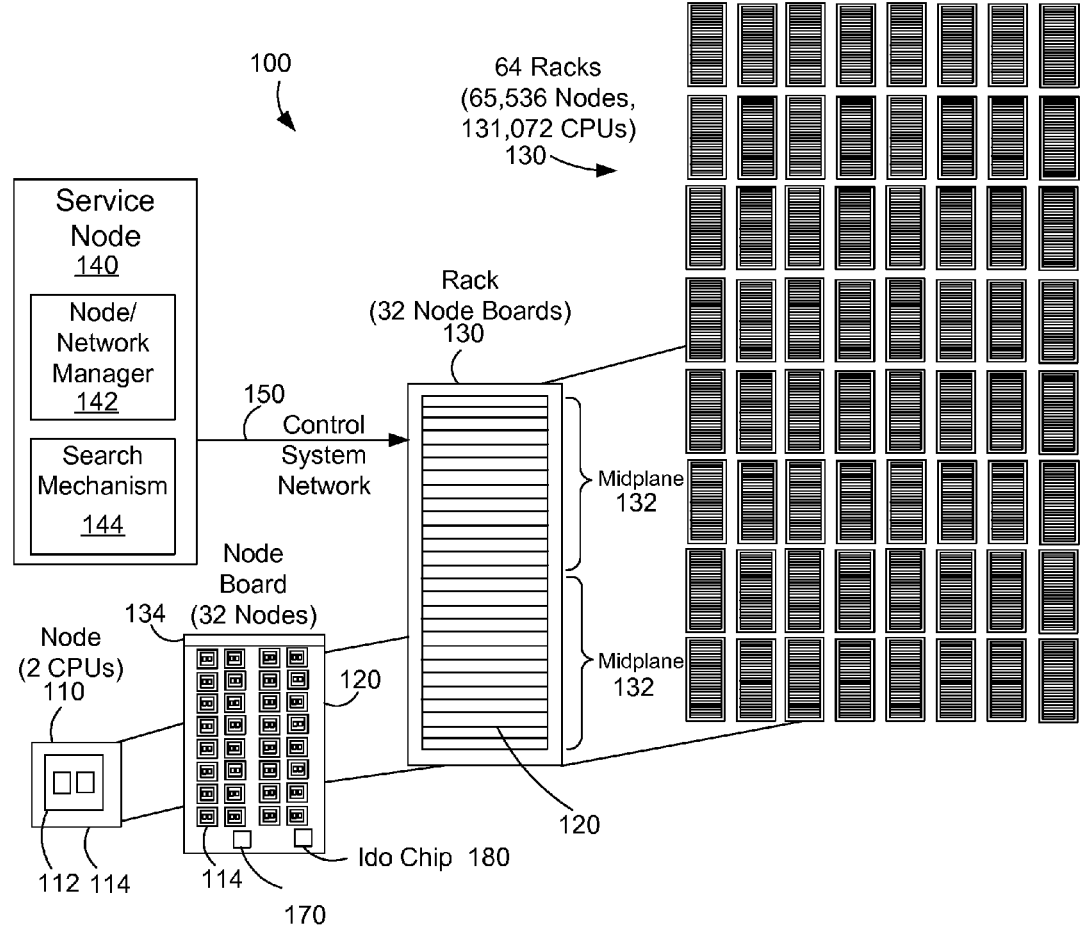
FIG. 1 is a block diagram of a parallel computer with a search mechanism for an in-memory database that facilitates database retrieval with a non-unique key index.

FIG. 1 shows a block diagram that represents a massively parallel computer system 100 that incorporates many of the features in the Blue Gene/L computer system. The Blue Gene/L system is a scalable system in which the maximum number of compute nodes is 65,536. Each node 110 has an application specific integrated circuit (ASIC) 112, also called a Blue Gene/L compute chip 112. The compute chip incorporates two processors or central processor units (CPUs) and is mounted on a node daughter card 114. The node also typically has 512 megabytes of local memory (not shown). A node board 120 accommodates 32 node daughter cards 114 each having a node 110. Thus, each node board has 32 nodes, with 2 processors for each node, and the associated memory for each processor. A rack 130 is a housing that contains 32 node boards 120. Each of the node boards 120 connect into a midplane printed circuit board 132 with a midplane connector 134. The midplane 132 is inside the rack and not shown in FIG. 1. The full Blue Gene/L computer system would be housed in 64 racks 130 or cabinets with 32 node boards 120 in each. The full system would then have 65,536 nodes and 131,072 CPUs (64 racks×32 node boards×32 nodes×2 CPUs).

The Blue Gene/L computer system structure can be described as a compute node core with an I/O node surface, where communication to 1024 compute nodes 110 is handled by each I/O node that has an I/O processor 170 connected to the service node 140. The I/O nodes have no local storage. The I/O nodes are connected to the compute nodes through the logical tree network and also have functional wide area network capabilities through a gigabit ethernet network (not shown). The gigabit Ethernet network is connected to an I/O processor (or Blue Gene/L link chip) 170 located on a node board 120 that handles communication from the service node 140 to a number of nodes. The Blue Gene/L system has one or more I/O processors 170 on an I/O board (not shown) connected to the node board 120. The I/O processors can be configured to communicate with 8, 32 or 64 nodes. The service node uses the gigabit network to control connectivity by communicating to link cards on the compute nodes. The connections to the I/O nodes are similar to the connections to the compute node except the I/O nodes are not connected to the torus network.

Again referring to FIG. 1, the computer system 100 includes a service node 140 that handles the loading of the nodes with software and controls the operation of the whole system. The service node 140 is typically a mini computer system such as an IBM pSeries server running Linux with a control console (not shown). The service node 140 is connected to the racks 130 of compute nodes 110 with a control system network 150. The control system network provides control, test, and bring-up infrastructure for the Blue Gene/L system. The control system network 150 includes various network interfaces that provide the necessary communication for the massively parallel computer system. The network interfaces are described further below.

The service node 140 manages the control system network 150 dedicated to system management. The control system network 150 includes a private 100-Mb/s Ethernet connected to an Ido chip 180 located on a node board 120 that handles communication from the service node 140 to a number of nodes. This network is sometime referred to as the JTAG network since it communicates using the JTAG protocol. All control, test, and bring-up of the compute nodes 110 on the node board 120 is governed through the JTAG port communicating with the service node. In addition, the service node 140 includes a node/network manager 142. The node/network manager 142 comprises software in the service node and may include software in the nodes to manage the nodes and software applications that are executing on the nodes. The service node 140 further includes a search mechanism 144 to perform an in-memory database search as described herein. Portions of the search mechanism 144 may execute on the service node while other portions of the search mechanism are loaded into the nodes (shown as 144 in FIG. 2). The in-memory database search may be initiated from the service node or from the compute nodes 110. The search mechanism 144 is described more fully below.

The Blue Gene/L supercomputer communicates over several communication networks. The 65,536 computational nodes and 1024 I/O processors 170 are arranged into both a logical tree network and a logical 3-dimensional torus network. The torus network logically connects the compute nodes in a lattice like structure that allows each compute node 110 to communicate with its closest 6 neighbors. Other communication networks connected to the node include a JTAG network and a the global interrupt network. The JTAG network provides communication for testing and control from the service node 140 over the control system network 150 shown in FIG. 1. The global interrupt network is used to implement software barriers for synchronization of similar processes on the compute nodes to move to a different phase of processing upon completion of some task. Further, there are clock and power signals to each compute node 110.

Figure 2:
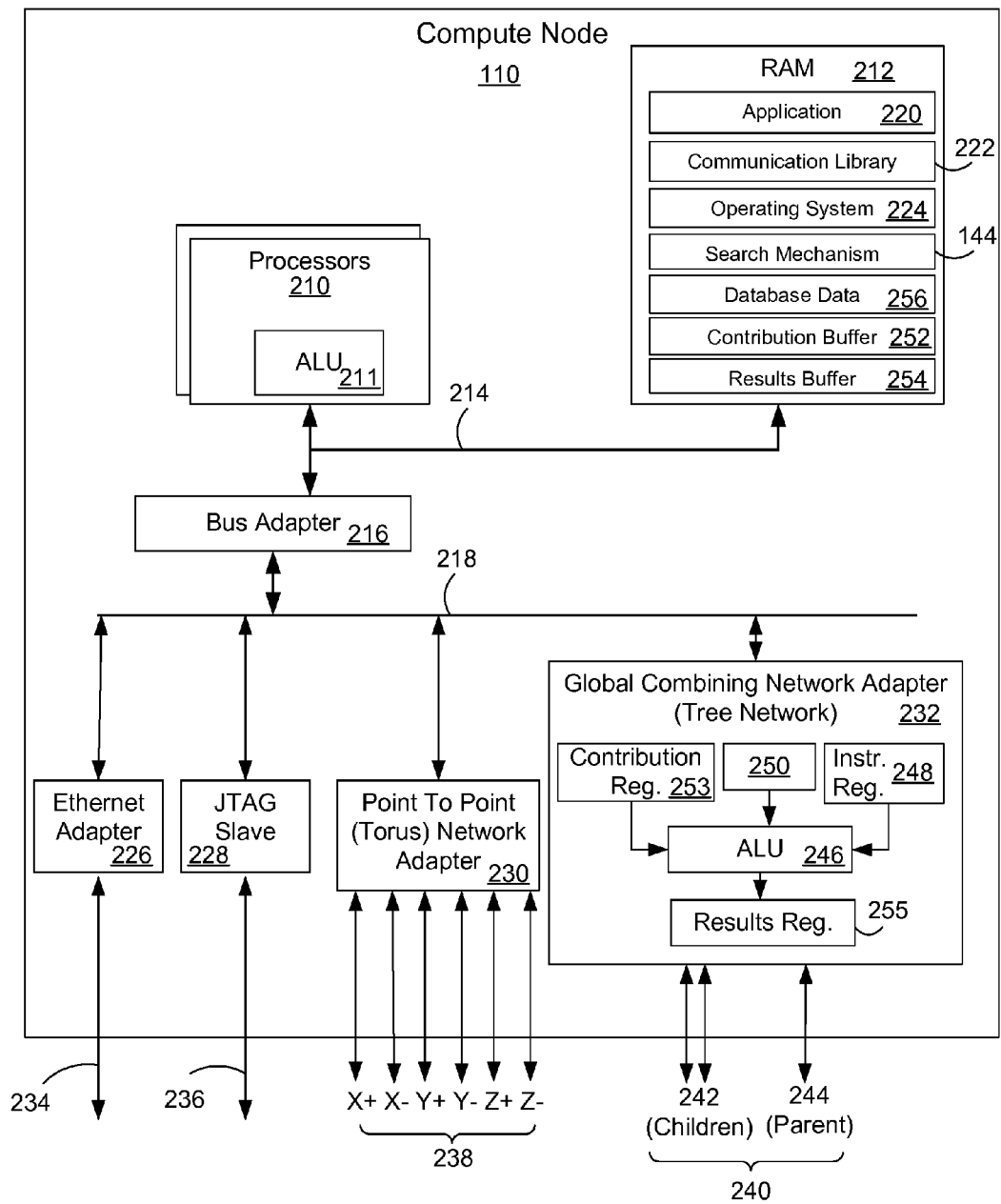
FIG. 2 is a block diagram of a compute node to illustrate the network connections to the compute node.

FIG. 2 sets forth a block diagram of an exemplary compute node as introduced above. The compute node 110 of FIG. 2 includes a plurality of computer processors 210, each with an arithmetic logic unit (ALU) 211, as well as random access memory ('RAM') 212. Processors 210 are connected to RAM 212 through a high-speed memory bus 214. Also connected to the high-speed memory bus 214 is a bus adapter 216. The bus adapter 216 connects to an extension bus 218 that connects to other components of the compute node. Stored in RAM 212 is an application program 220, a module of computer program instructions that carries out parallel, user-level data processing using parallel algorithms. Also stored in RAM 212 is a parallel communication library 222, a library of computer program instructions that carry out parallel communications among compute nodes, including point to point operations as well as collective operations. Application program 220 executes collective operations by calling software routines in parallel communications library 222.

Also stored in RAM 212 is an operating system 224, a module of computer program instructions and routines for an application program's access to other resources of the compute node. The quantity and complexity of tasks to be performed by an operating system on a compute node in a parallel computer are typically smaller and less complex than those of an operating system on typical stand alone computer. The operating system may therefore be quite lightweight by comparison with operating systems of general purpose computers, a pared down version as it were, or an operating system developed specifically for operations on a particular parallel computer. Operating systems that may usefully be improved and simplified for use in a compute node include UNIX™, Linux™, Microsoft XP™, AIX™, IBM's i5/OS™, and others as will occur to those of skill in the art.

As introduced above, the RAM 212 includes a search mechanism 144 which may work in concert with a portion of the search mechanism 144 residing in the service node 140 as shown in FIG. 1. The search mechanism 144 includes software instructions to search the in-memory database using the global combining network 240, which is described more fully below. A portion of the in-memory database is shown to reside on the compute note 110 as database data 256.

The compute node 110 of FIG. 2 includes several communications adapters 226, 228, 230, 232 for implementing data communications with other nodes of a parallel computer. Such data communications may be carried out serially through RS-232 connections, through external buses such as USB, through data communications networks such as IP networks, and in other ways as will occur to those of skill in the art. Communications adapters implement the hardware level of data communications through which one computer sends data communications to another computer, directly or through a network.

The data communications adapters in the example of FIG. 2 include a Gigabit Ethernet adapter 226 that couples example compute node 110 for data communications to a Gigabit Ethernet 234. Gigabit Ethernet is a network transmission standard, defined in the IEEE 802.3 standard, that provides a data rate of 1 billion bits per second (one gigabit). Gigabit Ethernet is a variant of Ethernet that operates over multimode fiber optic cable, single mode fiber optic cable, or unshielded twisted pair.

The data communications adapters in the example of FIG. 2 include a JTAG Slave circuit 228 that couples the compute node 110 for data communications to a JTAG Master circuit over a JTAG network 236. JTAG is the usual name used for the IEEE 1149.1 standard entitled Standard Test Access Port and Boundary-Scan Architecture for test access ports used for testing printed circuit boards using boundary scan. JTAG boundary scans through JTAG Slave 236 may efficiently configure processor registers and memory in compute node 110.

The data communications adapters in the example of FIG. 2 include a Point To Point Network Adapter 230 that couples the compute node 110 for data communications to a network 238. In Blue Gene, the Point To Point Network is typically configured as a three-dimensional torus or mesh. Point To Point Adapter 230 provides data communications in six directions on three communications axes, x, y, and z, through six bidirectional links 238: +x, −x, +y, −y, +z, and −z.

The data communications adapters in the example of FIG. 2 include a Global Combining Network Adapter 232 that couples the compute node 110 for data communications to a network 240 configured as a binary tree. Global Combining Network Adapter 232 provides data communications through three bidirectional links: two links 242 to children nodes and one link 244 to a parent node. The Global Combining Network Adapter 232 of each node has additional hardware to support operations on the global combining network as described further below.

The compute node 110 includes a second ALU 246 that is dedicated to the exclusive use of Global Combining Network Adapter 232 for use in performing the arithmetic and logical functions of reduction operations on the Global Combining Network 240. Computer program instructions of a reduction routine in parallel communications library 222 may latch an instruction for an arithmetic or logical function into instruction register 248. When the arithmetic or logical function of a reduction operation is a 'sum' or a 'logical or,' for example, Global Combining Network Adapter 232 may execute the arithmetic or logical operation by use of ALU 211 in processor 210 or, typically much faster, by use of the dedicated ALU 246 using data provided by other nodes on the global combining network 240 and data provided by the processor 210 on the compute node 110. In such a manner, computer program instructions in the parallel communications library 222 may configure the ALU 246 of the adapter 232 to perform a specified function such as a parallel-prefix operation. The compute node 110 may then perform the parallel-prefix operation with the ALU 246 on a global combining network adapter 232 for the global combing network 240 using data provided by nodes on the children network 242 and the compute node 110. The ALU output may then be passed up to the parent node on the parent network 244.

The Global Combining Network Adapter 232 allows the parallel computer to perform collective operations on the compute nodes of a parallel computer system arranged in a binary tree. The collective operations use the contribution register 253, the ALU 246 and the results register 255. The contribution register 253 and the results register 255 can be used to hold a portion of a larger operand held in the RAM 212. One type of collective operation is an all reduce operation. An all reduce operation combines all the elements provided in an input buffer of each processor in the group using a common operation and then returns the combined value in an output buffer on all nodes. An all reduce OR operation is an all reduce operation where the operator on the data is a bitwise "OR" operation, where the "OR" is done on a bit-by-bit basis as is known in the art. In the all reduce OR operation herein, the search information on each node is combined to give a search result for the in-memory database. For example, to perform an all reduce OR operation on the compute node shown in FIG. 2, the contents of a contribution buffer 252 in the RAM 212 is compared with inputs from the children nodes on the links 242 and the result is loaded into the results buffer 254. Since the size of the data is such that the ALU 242 is not able to operate on all the data at once, a portion of the contribution buffer 252 is loaded into a contribution register 253 and the results of the operation are stored in a results register 255 and then passed to the results buffer 254 in RAM 212. The local results in the results buffer 254 of the all reduce "OR" operation is then passed to the parent node. The same operation is then repeated on each node up the tree network as shown in FIG. 3 described further below.

Often when performing arithmetic operations, such as the all reduce "OR" operation or a parallel-prefix operations, the global combining network adapter 232 only serves to combine data received from the children nodes and pass the result up the network 240 to the parent node. Similarly, the global combining network adapter 232 may only serve to transmit data received from the parent node and pass the data down the network 240 to the children nodes. Thus the processors 210 on the compute node 110 are not loaded by ALU 246 transaction to pass data up or down the global combining network 240. A processor 210 may inject the identity element into the dedicated ALU 246 for the particular arithmetic operation being perform in the ALU 246 in order to prevent alteration of the output of the ALU 246 when the node should be modifying the data for the operation. The contribution registers 250 injects an identity element that corresponds to the particular arithmetic operation performed by the ALU. For an "OR" operation this would be a zero. For example, when performing an all reduce "OR" operation, the global combining network adapter 232 performs a bitwise OR on the data received from the children nodes, and the results contributed by the local node. The data contributed by the local node is a null because there was no match found on a search of the local node, the contribution register 250 thus injects zeros because that is the identity element for this operation. This will result in the node passing up to the next node in the tree the same data received from the child nodes.

Figure 3:
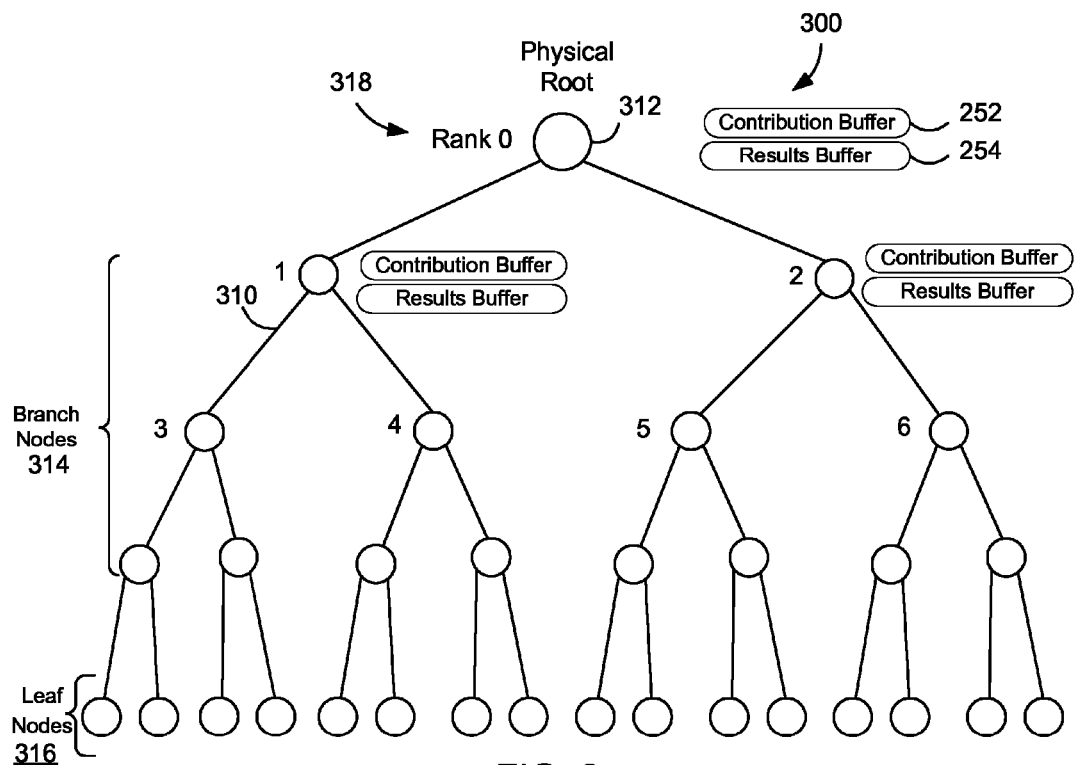
FIG. 3 is a block diagram representing a global combining network in a parallel computer system.

FIG. 3 shows a binary tree 300 illustrating an exemplary global combining network. The example data communications network of FIG. 3 includes data communications links connected to the compute nodes so as to organize the compute nodes as a tree. In the example of FIG. 3, circles represent compute nodes 110 of a parallel computer, and the lines between the circles represent data communications links 310 between compute nodes. The data communications links 310 are implemented with global combining network adapters similar to the one illustrated for example in FIG. 2, with each node typically providing data communications to and from two children nodes and data communications to and from a parent node, with some exceptions. Nodes in the global combining network may be characterized as a physical root node 312, branch nodes 314, and leaf nodes 316. The physical root node 312 has two children but no parent. The leaf nodes 316 each has a parent, but leaf nodes have no children. The branch nodes 314 each has both a parent and two children. The links and compute nodes are thereby organized by this data communications network optimized for collective operations into a binary tree 300. For clarity of explanation, the data communications network of FIG. 3 is illustrated with only 31 compute nodes, but readers will recognize that a global combining network may contain only a few compute nodes or may contain thousands of compute nodes.

The compute nodes 110 of the parallel computer 100 are organized into at least one operational group of compute nodes for collective parallel operations. An operational group of compute nodes is the set of compute nodes upon which a collective parallel operation executes. FIG. 3 illustrates an operational group of compute nodes organized as a global combining network 300. Each compute node in the operational group is assigned a unique rank that identifies the particular compute node in the operational group. In the example of FIG. 3, each node 110 in the tree is assigned a unit identifier or 'rank' 318. A node's rank 318 uniquely identifies the node's location in the tree network for use in both point to point and collective operations in the tree network. The ranks in this example are assigned as integers beginning with 0 assigned to the root node 312, 1 assigned to the first node in the second layer of the tree, 2 assigned to the second node in the second layer of the tree, 3 assigned to the first node in the third layer of the tree, 4 assigned to the second node in the third layer of the tree, and so on. For ease of illustration, only the ranks of the first three layers of the tree are shown here, but all compute nodes in the tree network are assigned a unique rank.

Collective operations are implemented with data communications among the compute nodes of an operational group. Collective operations are those functions that involve all the compute nodes of an operational group. A collective operation is an operation, a message-passing computer program instruction that is executed simultaneously, that is, at approximately the same time, by all the compute nodes in an operational group of compute nodes. Such an operational group may include all the compute nodes in a parallel computer (100) or a subset all the compute nodes. Collective operations are often built around point to point operations. A collective operation requires that all processes on all compute nodes within an operational group call the same collective operation with matching arguments.

In the example of FIG. 3, the global combining network 300 provides data communications among all the nodes 110 in the binary tree to effect collective operations such as a parallel reduction operation. Each ranked node has a contribution buffer 252 for storing the contribution of the ranked compute node and a results buffer 254 for storing results of a parallel reduction operation. Each node performs the reduce operation using the node's contribution and the contributions from the child nodes below that node. That node then passes the result of the operation up to that node's parent node. In such a manner, all the results cascade up to the physical root node 312 into a final result for the entire operation across all the nodes of the tree. Upon the results reaching the physical root node 312, the physical root 312 sends the result of the entire operation back down the tree to each compute node 110 such that the requesting node will have the results data.

A 'broadcast' is an example of a collective operation for moving data among compute nodes of an operational group. A 'reduce' operation is an example of a collective operation that executes arithmetic or logical functions on data distributed among the compute nodes of an operational group. An operational group may be implemented as, for example, an MPI 'communicator.' 'MPI' refers to 'Message Passing Interface,' which is a prior art parallel communications library containing modules of computer program instructions for data communications on parallel computers. Examples of prior-art parallel communications libraries that may be improved for parallel-prefix broadcast for a parallel-prefix operation on a parallel computer as describe herein include MPI and the 'Parallel Virtual Machine' ('PVM') library. PVM was developed by the University of Tennessee, The Oak Ridge National Laboratory and Emory University. MPI is promulgated by the MPI Forum, an open group with representatives from many organizations that define and maintain the MPI standard. MPI at the time of this writing is a de facto standard for communication among compute nodes running a parallel program on a distributed memory parallel computer. This specification sometimes uses MPI terminology for ease of explanation, although the use of MPI as such is not a requirement or limitation herein.

Some collective operations have a single originating or receiving process running on a particular compute node in an operational group. For example, in a 'broadcast' collective operation, the process on the compute node that distributes the data to all the other compute nodes is an originating process. In a 'gather' operation, for example, the process on the compute node that received all the data from the other compute nodes is a receiving process. The compute node on which such an originating or receiving process runs is referred to as a logical root.

A parallel-prefix operation is an operation that applies a commutative binary operator 'θ', such as a bitwise OR, addition, or multiplication, to an n-element global array $\{v_0, v_1, v_2, \ldots, v_{n-1}\}$ to produce an n-element parallel-prefix results array $\{(v_0), (v_0 \theta v_1), (v_0 \theta v_1 \theta v_2), \ldots, (v_0 \theta v_1 \theta v_2 \theta \ldots \theta v_{n-1}\}$. Because each element of the global array is typically contributed by a different ranked compute node of an operational group, each position in the results array stores the result of applying the parallel-prefix operation to the parallel-prefix contribution of one more ranked node than the previous position in the results array. For example, consider an operational group having three ranked nodes, each node contributing a value of '1,' and that the parallel-prefix operation specifies using a Addition operator. The global array containing all the contributions from the nodes, therefore, is {1, 1, 1}. The parallel-prefix results array is {1, 2, 3} because the first position merely contains value first position of the global array, the second position contains the result of applying the Addition to the contributions of ranked nodes one and two in the first and second positions of the global array, and the third position contains the result of applying the Addition to the contributions of ranked nodes one, two, and three in the first, second, and third positions of the global array.

A 'bitwise OR operation,' as the term is used in this specification, is an inclusive bitwise OR operation rather than an exclusive bitwise OR operation. The symbol for the inclusive bitwise OR function in the C and C++ programming languages is '|'. The inclusive bitwise OR function conducts a logical OR function separately on each bit of its operands. The effect is to turn bits on. For these operands, for example, x=00000000 00000001 00000000, in decimal, x=010,
and y=00000000 00000000 00000010, in decimal, y=002, x=x|y yields x=00000000 00000001 00000010, in decimal, x=012. That is, all the bits that were on in each operand are also on in the result of the bitwise OR function.

Most collective operations are variations or combinations of four basic operations: broadcast, gather, scatter, and reduce. The interfaces for these collective operations are defined in the MPI standards promulgated by the MPI Forum. Algorithms for executing collective operations, however, are not defined in the MPI standards. In a broadcast operation, all processes specify the same root process, whose buffer contents will be sent. Processes other than the root specify receive buffers. After the operation, all buffers contain the message from the root process.

A scatter operation, like the broadcast operation, is a one-to-many collective operation. In a scatter operation, the logical root divides data on the root into segments and distributes a different segment to each compute node in the operational group. In scatter operation, all processes typically specify the same receive count. The send arguments are only significant to the root process, whose buffer actually contains sendcount*N elements of a given datatype, where N is the number of processes in the given group of compute nodes. The send buffer is divided and dispersed to all processes (including the process on the logical root). Each compute node is assigned a sequential identifier termed a 'rank.' After the operation, the root has sent sendcount data elements to each process in increasing rank order. Rank 0 receives the first sendcount data elements from the send buffer. Rank 1 receives the second sendcount data elements from the send buffer, and so on.

A gather operation is a many-to-one collective operation that is a complete reverse of the description of the scatter operation. That is, a gather is a many-to-one collective operation in which elements of a datatype are gathered from the ranked compute nodes into a receive buffer in a root node.

A reduce operation is also a many-to-one collective operation that includes an arithmetic or logical function performed on two data elements. All processes specify the same 'count' and the same arithmetic or logical function. After the reduction, all processes have sent count data elements from computer node send buffers to the root process. In a reduction operation, data elements from corresponding send buffer locations are combined pair-wise by arithmetic or logical operations to yield a single corresponding element in the root process' receive buffer. Application specific reduction operations can be defined at runtime. Parallel communications libraries may support predefined operations. MPI, for example, provides the following pre-defined reduction operations:

| | |
|---|---|
| MPI_MAX | maximum |
| MPI_MIN | minimum |
| MPI_SUM | sum |
| MPI_PROD | product |
| MPI_LAND | logical and |
| MPI_BAND | bitwise and |
| MPI_LOR | logical or |
| MPI_BOR | bitwise or |
| MPI_LXOR | logical exclusive or |
| MPI_BXOR | bitwise exclusive or |

A parallel-prefix broadcast for a parallel-prefix operation on a parallel computer as illustrated in FIG. 1 can be done with the following steps: configuring, on each ranked compute node, a parallel-prefix contribution buffer for storing the parallel-prefix contribution of the ranked compute node; configuring, on each ranked compute node, a parallel-prefix results buffer for storing results of a parallel-prefix operation, the parallel-prefix results buffer having a position for each compute node that corresponds to the rank of the compute node; repeatedly for each position in the parallel-prefix results buffer: processing in parallel by each ranked compute node in the operational group: determining, by the ranked compute node, whether the current position in the parallel-prefix results buffer is to include a contribution of the ranked compute node, if the current position in the parallel-prefix results buffer is not to include the contribution of the ranked compute node, contributing the identity element for the operation, and if the current position in the parallel-prefix results buffer is to include the contribution of the ranked compute node, contributing the parallel-prefix contribution of the ranked compute node, performing, by each ranked compute node, the operation using the contributed identity elements and the contributed parallel-prefix contributions, yielding a result from the operation, and storing, by each ranked compute node, the result in the position in the parallel-prefix results buffer.

FIGS. 4 through 8 illustrate a first example of a non-unique key search on a parallel computer system with a search mechanism that uses parallel prefix and all reduce operations to search an in-memory database distributed across the parallel computer system. In this first example, a bit mask is created that has a single bit for each record of the in-memory database. In summary, this first example performs the operations of allocating a bitmask, broadcasting a search key for a local search of each node, creating a local contribution to the bitmask, creating a parallel prefix, and then performing an all reduce operation to create a search result containing a complete bitmask. Each of these operations will be described further below.

Before initiating a search, the search mechanism 144 allocates a bitmask to be used for the search. The bitmask preferably has a single bit to represent each record in the database. This example assumes that the number of records in the database has been determined previously. Alternatively the size of the bitmask could be variable and determined during the all reduce operation, but this more complex example is not shown here for simplicity.

Figure 4:
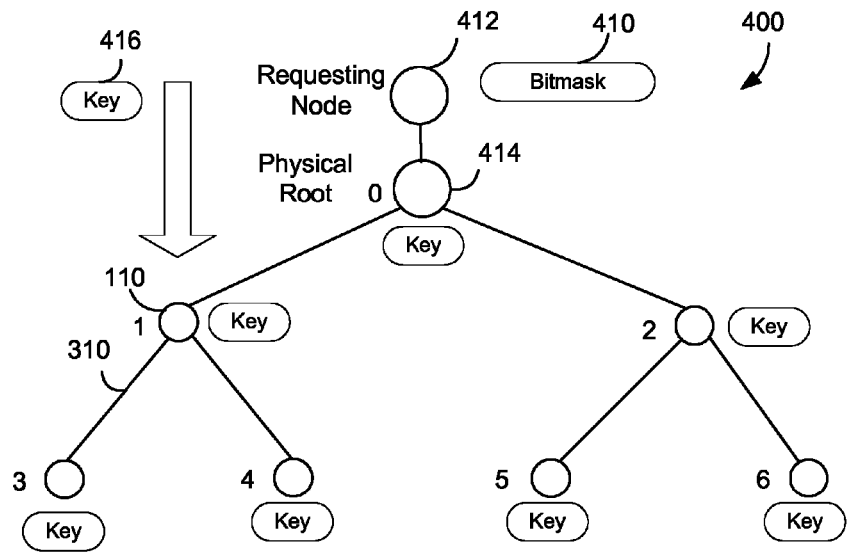
FIG. 4 is a block diagram of a global combining network to illustrate an example of broadcasting a key to each node.

FIG. 4 illustrates a global combining network 400 to retrieve a database record from an in-memory database having a non-unique key on a parallel computer system. The global combining network 400 is similar to the network described above with reference to FIG. 3. The global combining network 400 includes a requesting node 412 that initiates a search for a data record in the in-memory database residing on the nodes 110. The requesting node 412 appears as a unique node in FIG. 4 for illustration purposes, but in reality may be any node in the network. The requesting node 412 may be the physical root node 414, any of the leaf or branch nodes 110, or it may be from the service node 140 shown in FIG. 1. The requesting node 412 initiates a database search by broadcasting a key 416 to each node in the global combining network 400. Each of the nodes 110 pass the key 416 to any child nodes until all the nodes have the key 416 as shown. We assume for this example that key 416 is non-unique, which means it may identify multiple records in the database.

Figures 5, 6:
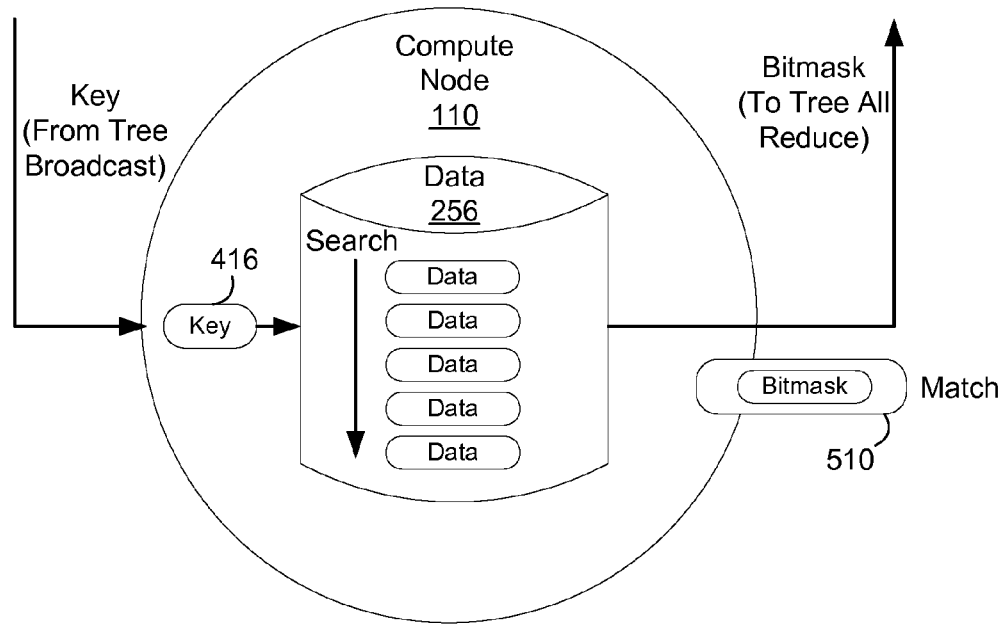
FIG. 5 is a block diagram that illustrates searching the in-memory database of a node for data corresponding to the key broadcast to each node in FIG. 4.
FIG. 6 is a table for a bitmask query example that shows the query results data and corresponding bitmask that is created for each node.

FIG. 5 represents a node 110 on the global combining network 400 (FIG. 4) to further illustrate a unique key search of an in-memory database on a parallel computer system. The compute node 110 receives a non-unique key 416 that is broadcast to the whole tree structure of the global combining network. The compute node 110 uses the key 416 to search the database data 256 in the local memory of the node. The database data 256 is the local portion of the in-memory database that is distributed over many nodes of the parallel computer system. The search may be accomplished through a compute node processor (212 in FIG. 2). The local search of the data 512 can be a sequential search or any other search known in the art. The local search finds every data record that corresponds to the key 416. For each matching data record a bit is set in the bitmask 510 as described below with reference to FIG. 6. The bitmask with the appropriate bits set is provided to the network through the global combining network adapter as described above and further discussed below.

FIG. 6 shows a table 600 of information to describe the first bitmask query example. Not all the information shown in this table actually resides in the in-memory database but is reproduced here to illustrate the example. The table 600 shows the number of records, records matching the search, the beginning bitmask, and the corresponding bitmask after the search results for each node in the database. For example, in the first column 610, Node 0 is shown to have four records. In the node search described above with reference to FIG. 5, records two and three of Node 0 were found to match the search key. A bit mask for Node 0 is allocated to have four bits ("0000") as shown in the Bitmask column 612. After the search, the bits corresponding to records two and three are set in the bitmask such that the bitmask after the search is "0110". This bitmask is placed in the contribution buffer for Node 0 so that an all reduce operation on the global combining network will provide a search result comprising a completed bitmask as described further below. Each of the nodes in the network simultaneously perform this operation to search the node and create a bitmask for the results of the search on each node. For this example, the bitmask created on each node is shown in the table 600.

Figure 7:
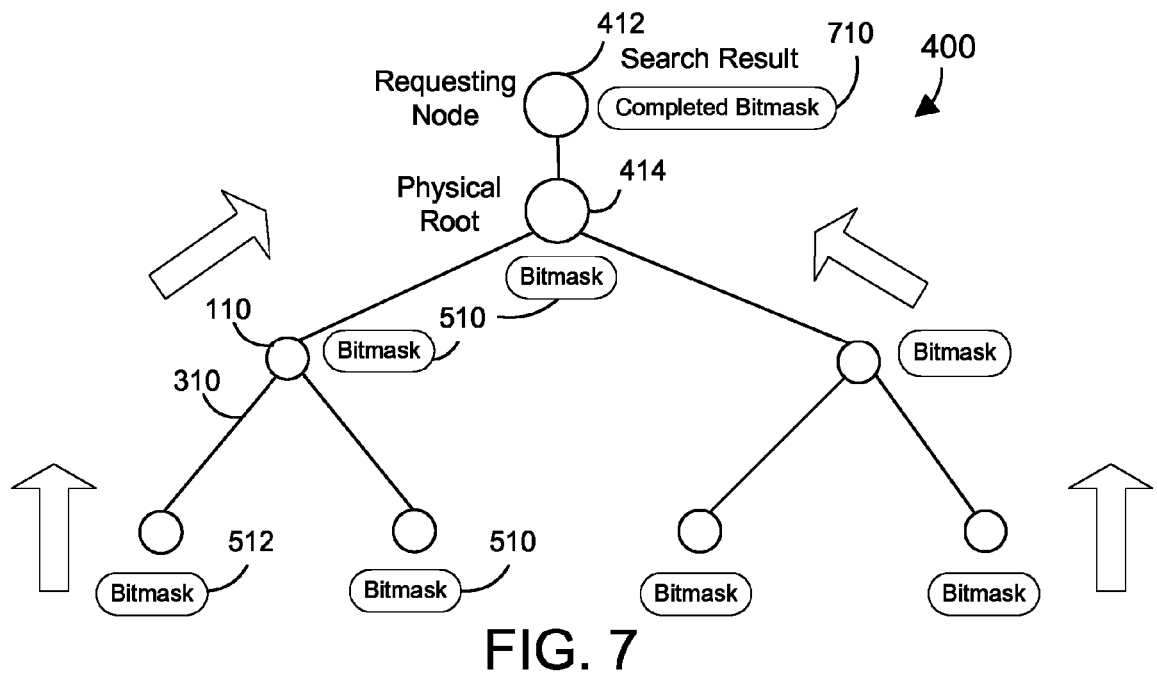
FIG. 7 is a block diagram that illustrates using the global combining network to combine the bitmasks for each node.

FIG. 7 shows the global combining network 400 as the bitmask is sent to the physical root node 414 with an all reduce operation. After sending the initial request and the key as described above, the requesting node waits an appropriate amount of time and then initiates a tree all reduce operation. Each node provides its portion of the bitmask 710 in the results buffer of the node as described above. Thus, the bitmask 710 at each node may in fact contain different information. A tree all reduce operation performs an "OR" function on the buffers of the global combining network so that the matching record is placed in the results buffer. This results buffer is then passed to the parent node and the process is repeated for each node on the network until the completed bitmask 720 is assembled in the physical root node 414. The completed bitmask 720 is the overall search result. The completed bitmask 720 is sent to the requesting node 412, which may be a node down the network or on the service node as described above. The completed bitmask 720 can then be used in conjunction with a parallel prefix of the number of records to perform query operations as described further below.

Figure 8:
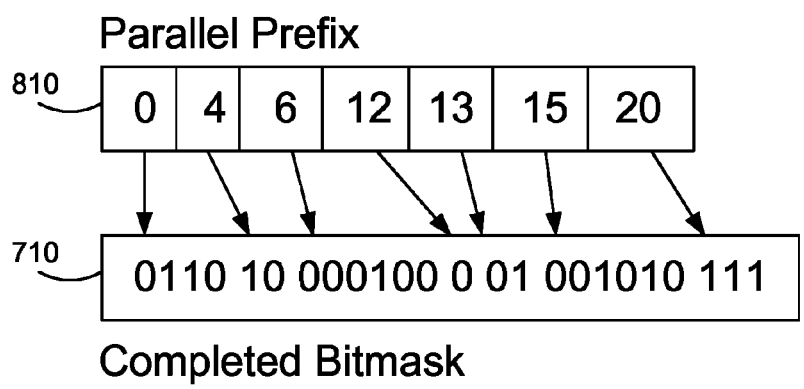
FIG. 8 is a table shows the results for the parallel prefix and all reduce operation on the example data shown in FIG. 6.

FIG. 8 shows a completed bitmask 710 according the example data in FIG. 6. Each bit of the bitmask represents a record in the database, and a "1" bit represents a matching record for the search key. The first four bits of the bitmask represent the records on Node 0, and the next two bits represent the records on Node 1, etc. for each node according to the node rank. At some point, a parallel prefix 810 is performed on the number of records in each node. The parallel prefix 810 then provides a boundary index into the completed bitmask to interpret the bitmask 710 data. Each integer in the parallel prefix 810 represents the beginning boundary of a node in the completed bitmask as shown by the arrows 812 between the parallel prefix and the completed bitmask.

Again referring to FIGS. 4 through 8, the completed bitmask 710 can be used in various ways to execute a query on the in-memory database. For example, counting the number of active bits, or "1" bits gives the number of records that match the query. For a retrieval operation, the bitmask could be broadcast to all the nodes with any elements not requested masked out (made zero). Each node could find its offset into the bitmask and then send the corresponding data records to the requesting node. Similarly, the bitmask could be used for multiple update or multiple delete by modifying the bitmask to indicate which records are to be updated or deleted and then broadcasting the modified bitmask to all the nodes to perform the updates and deletes.

Figures 9, 10:
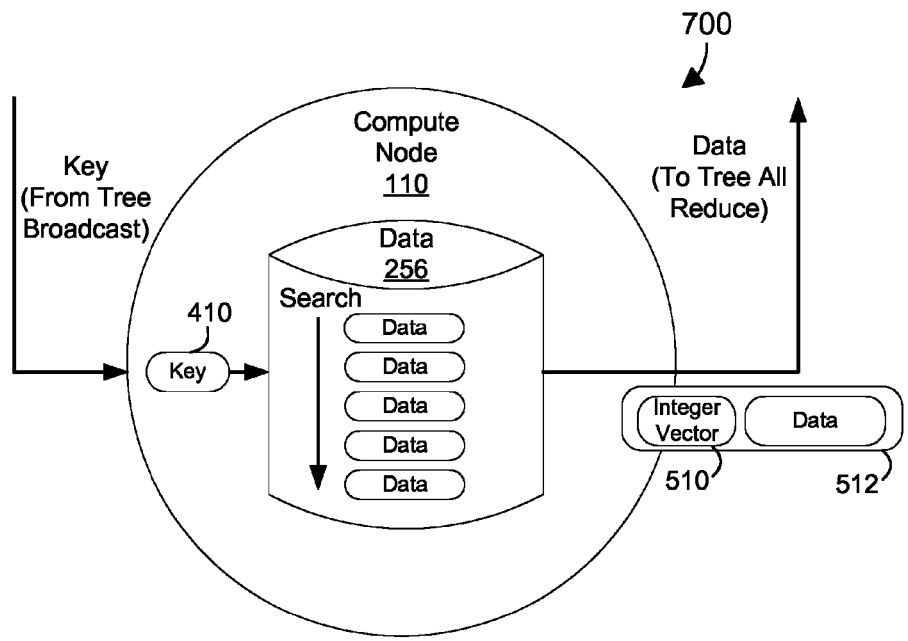
FIG. 9 is a block diagram for an integer vector example that illustrates searching the in-memory database for an integer vector and data records corresponding to the key broadcast to each node in FIG. 4.
FIG. 10 is a table for the integer vector example shown in FIG. 9 that shows the query matches and corresponding integer vector that is created for each node.
Figure 11:
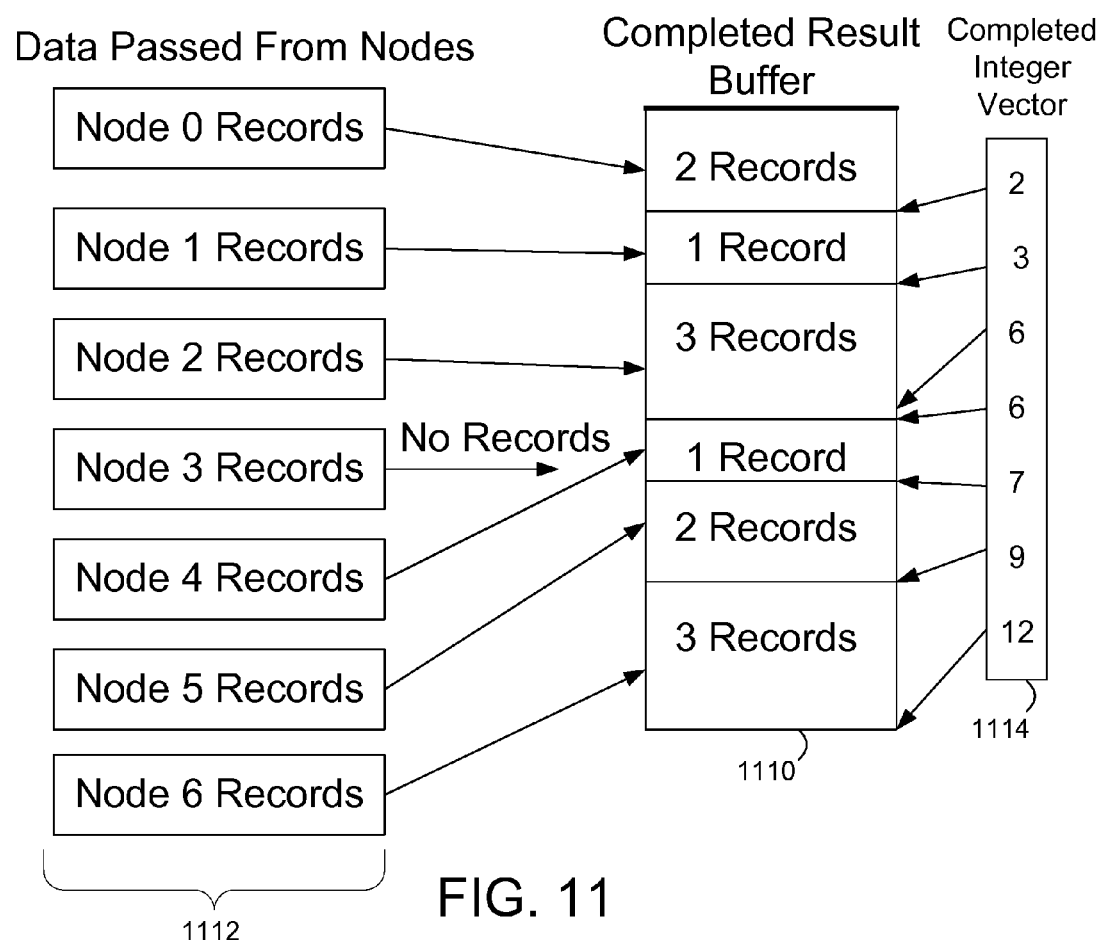
FIG. 11 is a table that shows the completed result buffer for the integer vector example shown in FIGS. 9 and 10.

FIGS. 9 through 11 illustrate a second example of a non-unique key search on a parallel computer system. The search mechanism on the parallel computer system uses parallel prefix and all reduce operations to provide an overall search result of an in-memory database distributed across the parallel computer system. In this second example, a search result is created that includes an integer vector that has a single integer for each matching record of the in-memory database and a results buffer that contains the actual data from the matching records. In summary, this second example performs the operations of allocating an integer vector, broadcasting a search key for a local search of each node, creating a search results that contains a local contribution to the integer vector, executing a parallel prefix to create a integer vector, and then performing an all reduce operation to create a search result containing a completed result buffer. Each of these operations will be described further below.

For the integer vector search of the second example, the search mechanism 144 allocates an integer vector to be used for the search. The integer preferably has a single integer to represent each node in the database. The integer vector is broadcast to the nodes along with the key 410 as shown in FIG. 9. The search mechanism performs the local search as described above. For each node, an integer vector 510 representing the number of matches on that node is placed in the results buffer. In addition, the actual data 512 that matches the search key 410 is also placed in the results buffer. An all reduce operation on all the nodes will then produce an integer vector at the root node in the manner described above. The all reduce operation also produces a completed result buffer with the data from all matching records as described in more detail below.

FIG. 10 shows a table 1000 of information to describe the second integer vector query example. Each row in table 1000 has data for entry for a specific node. Each entry includes the node number, the number of records, record match results from the search, the local integer vector before the parallel prefix, and the corresponding integer vector after the parallel prefix for each node in the database. For example, in the second column of entry 1010, Node 0 is shown to have four records. In the node search described above with reference to FIG. 5, records two and three of Node 0 were found to match the search key. In the fourth column of entry 1010, the integer vector for Node 0 is allocated to have an integer of 2 in the first position corresponding to this first node, and the rest of the vector is filled with zeros. This node vector is placed in the contribution buffer for Node 0 so that an all reduce operation on the global combining network will result in a complete integer vector as described further below. Similarly, in the second column for entry 1012, the integer vector for Node 1 is allocated to have an integer of 1 in the second position corresponding to this second node, and the rest of the vector is filled with zeros Each of the nodes in the network simultaneously perform this operation to search the node and create a bitmask for the results of the search on each node. For this example, the bitmask created on each node is shown in the table 610. The last column in table 1000 shows the integer vector as it is created by the parallel prefix operation. The completed integer vector shown in entry 1014 represents an integer vector that provides the node boundaries for the completed results buffer illustrated in FIG. 11. Each integer in the integer vector represents the ending record in the completed results buffer that corresponds to the node that contributed the integer, where Node 0 contributed the first integer and Node 1 contributed the second integer and so forth.

FIG. 11 shows the completed result buffer 1110 for the integer vector example shown in FIGS. 9 and 10. The completed results buffer includes the actual data records from each node that match the search key. The nodes 1112 contribute the records from the search as shown in table 1010. FIG. 11 further shows the completed integer vector 1114 that points to the node boundaries of the completed result buffer as described above.

Figure 12:
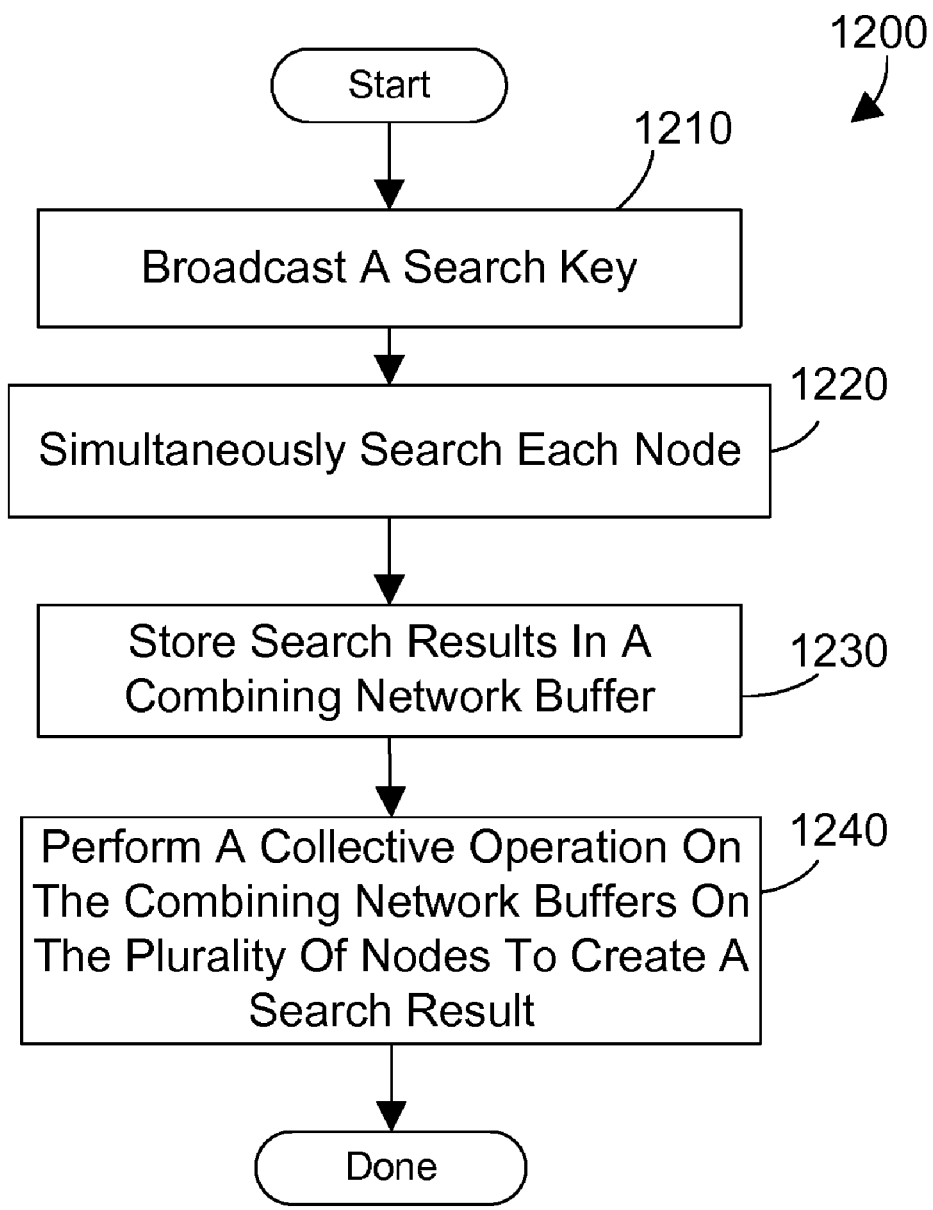
FIG. 12 is a general method flow diagram for a database search of an in-memory database having with a non-unique key.

FIG. 12 shows a general method 1200 for searching an in-memory database with a non-unique key index on a parallel computer system. This general example covers the two examples described in further detail with regards to FIGS. 13 and 14. The method may be executed on the processor of the compute nodes and/or the Global Combining Network Hardware as shown in FIG. 2. According to this method 1200, first broadcast a search key to all the nodes in the relevant portion of the network (step 1210). Then search each node's local portion of the in-memory database with the broadcast key (step 1220). Then store data in the combining network buffer determined by the search results for each node (step 1230). Then perform a collective operation on the combining network buffers on the nodes to create a search result (step 1240). The method is then done.

Figure 13:
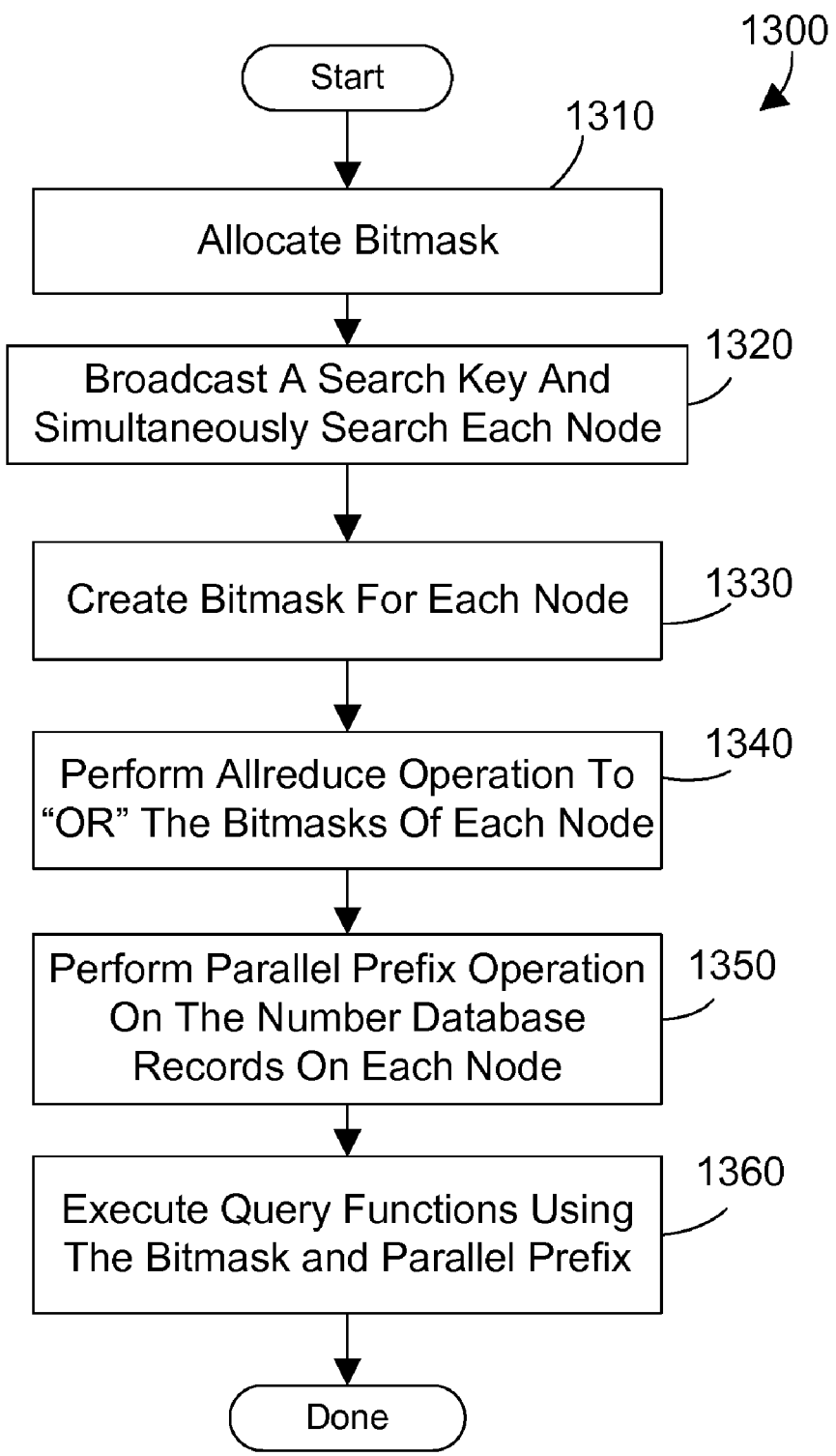
FIG. 13 is a method flow diagram for a database search of an in-memory database having with a non-unique keys using a bitmask for database matches.

FIG. 13 shows a method 1300 for searching an in-memory database with a non-unique key index on a parallel computer system. This example illustrates using a bitmask to represent matching records found on the nodes and a parallel prefix operation that provides the node boundaries into the bitmask. The method may be executed on the processor of the compute nodes and/or the Global Combining Network Hardware as shown in FIG. 2. According to this method 1300, first allocate a bitmask for all the records in the database on all the nodes (step 1310). Then broadcast a search key to all the nodes in the relevant portion of the network and search each node's local portion of the in-memory database with the broadcast key (step 1320). Then create a bitmask for each node (step 1330). Then perform an all reduce operation to "OR" the bitmasks of each node (step 1340). Then perform a parallel prefix operation on the number of database records on each node (step 1350). Then execute query functions using the bitmask and parallel prefix (step 1360). The method is then done.

Figure 14:
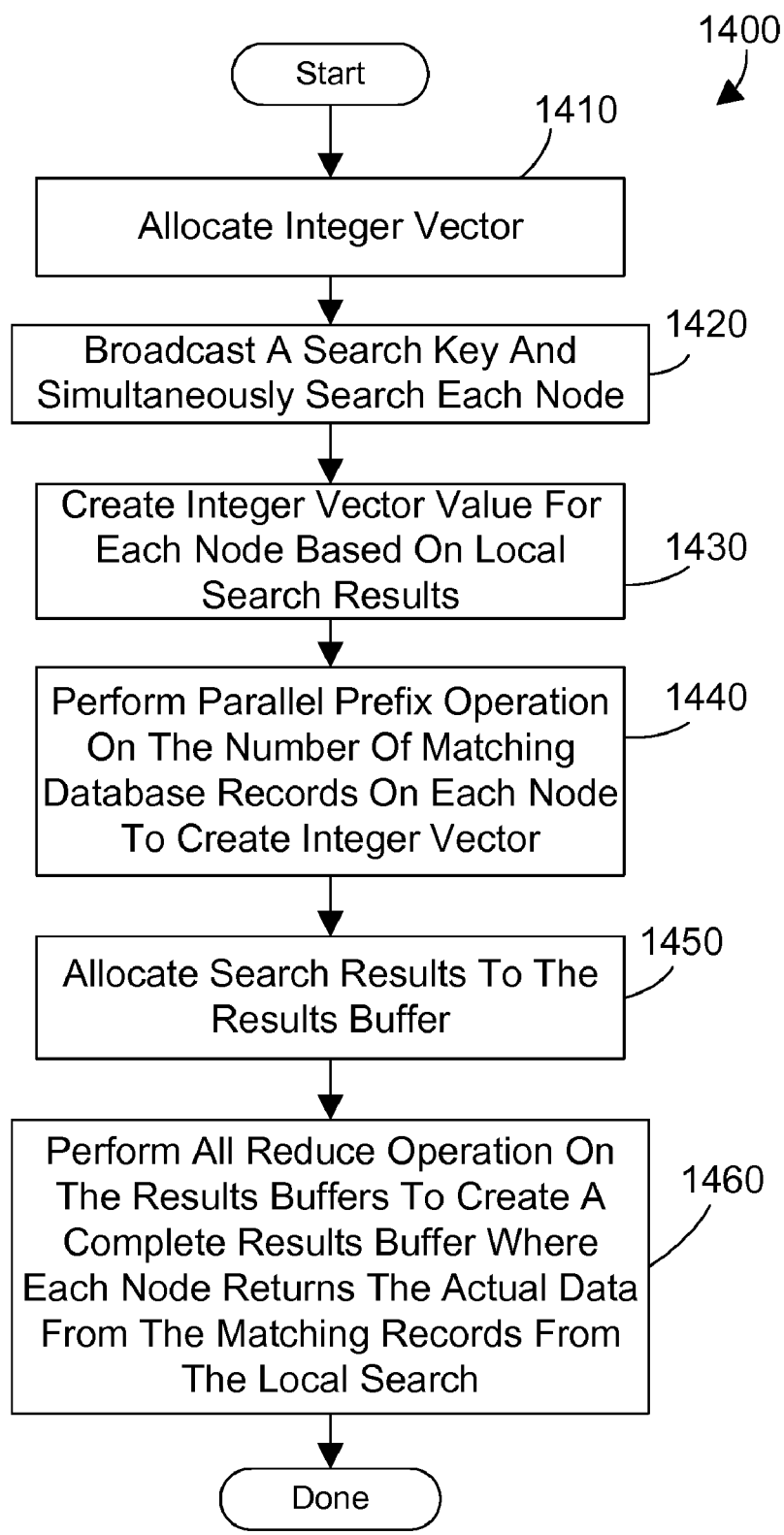
FIG. 14 is a method flow diagram for a database search of an in-memory database with a non-unique key using an integer vector for database matches.

FIG. 14 shows another method 1400 for searching an in-memory database with a non-unique key index on a parallel computer system. This example illustrates a parallel prefix operation that creates an integer vector that provides node boundaries into a completed result buffer. The completed results buffer contains the data records that match a search on each node. The method may be executed on the processor of the compute nodes and/or the Global Combining Network Hardware as shown in FIG. 2. According to this method 1400, First allocate an integer vector for all the nodes in the database (step 1410). Then broadcast a search key to all the nodes in the relevant portion of the network and search each node's local portion of the in-memory database with the broadcast key (step 1420). Then create an integer vector value for each node based on the local search results (step 1430). Then perform a parallel prefix operation on the number of matching database elements on each node to create a completed integer vector (step 1440). Then allocate the local search results to the results buffer (step 1450). Then perform an all reduce operation on the results buffers to create a completed results buffer where each node returns the actual data of the matching records from the local search (step 1460). The method is then done.

The detailed description introduces a method and apparatus for retrieving a database record from an in-memory database using a non-unique key. The parallel computer system performs a simultaneous search on each node of the computer system using the non-unique key and then utilizes a global combining network to combine the results from the searches of each node to efficiently and quickly search the entire database. The method and apparatus utilize network resources of a parallel computer system to provide an efficient and high speed search of the database.

One skilled in the art will appreciate that many variations are possible within the scope of the claims. Thus, while the disclosure is particularly shown and described above, it will be understood by those skilled in the art that these and other changes in form and details may be made therein without departing from the spirit and scope of the claims.

What is claimed is:

1. A computer apparatus for searching an in-memory database comprising:

a plurality of compute nodes each having a processor and computer memory operatively coupled to the processor, the computer memory having disposed within the computer memory a portion of the in-memory database, wherein the plurality of compute nodes further comprise a global combining network adapter (GCNA) for performing collective operations over a global combining network that connects the plurality of compute nodes in a binary tree where the plurality of compute nodes have a parent node and child nodes, wherein each of the plurality of compute nodes is assigned a unique rank which uniquely identifies the node's location in the binary tree network for use in both point to point and collective operations in the binary tree network, wherein the collective operations are variations or combinations of four operations comprising broadcast operation, gather operation, scatter operation and reduce operation, wherein the GCNA comprises an arithmetic logic unit (ALU) that operates on data in registers in the GCNA and stores the results in a results buffer;

a search mechanism in the computer memory that receives a non-unique search key and searches the portion of the in-memory database using the search key and places a local result in a contribution buffer; and wherein the search mechanism contributes to a search of the in-memory database for the non-unique search key through a collective operation on the buffers of the global combining network by combining data received from a child node with the contents of the contribution buffer and passing over the GCNA a combined result to the parent node.

2. The computer apparatus of claim 1 further comprising a service node connected to the plurality of compute nodes that initiates a search of the in-memory database located within the plurality of compute nodes.

3. The computer apparatus of claim 1 wherein the search result is a bitmask created by an all reduce operation, where each bit in the bitmask represents a record in the database and an active bit represents a record that matches the search.

4. The computer apparatus of claim 1 wherein the search result comprises an integer vector and a results buffer, where each integer in the integer vector represents an offset into the results buffer and where the results buffer contains all records in the database matching the search.

5. The computer apparatus of claim 4 wherein the integer vector is created with a parallel prefix operation and the results buffer is created with an all reduce operation.

6. The computer apparatus of claim 1 wherein the compute nodes are located in a massively parallel computer system.

7. A computer implemented method for searching an in-memory database on a parallel computer system comprising the steps of:

broadcasting a non-unique search key to a plurality of compute nodes, wherein the plurality of compute nodes comprise a processor, a memory and a global combining network adapter (GCNA), wherein the GCNA performs collective operations over a global combining network that connects the plurality of compute nodes in a binary tree with a parent node and child nodes a child node, wherein each of the plurality of compute nodes is assigned a unique rank which uniquely identifies the node's location in the binary tree network for use in both point to point and collective operations in the binary tree network, wherein the collective operations are variations or combinations of four operations comprising broadcast operation, gather operation, scatter operation and reduce operation, wherein the GCNA combines data received from the child nodes with local data and passes results to a parent node, wherein the GCNA comprises an arithmetic logic unit (ALU) that operates on data in registers in the GCNA and stores the results in a results buffer;

initiating a search on each of the plurality of nodes using the search key;

storing a local search result in a contribution combining network buffer;

performing a collective operation using the GCNA on the plurality of compute nodes to combine data from the child nodes with the contribution buffer and passing a result stored in a results buffer to the parent node to create a database search result for searching the in-memory database for the non-unique search key.

8. The computer implemented method of claim 7 wherein the method is initiated from a service node connected to the plurality of compute nodes.

9. The computer implemented method of claim 7 wherein a contribution register and a results register connected to the ALU hold a portion of the contribution buffer and results buffer respectively.

10. The computer implemented method of claim 7 further comprising the steps of:
    allocating a bitmask;
    creating a bitmask for each node;
    performing the all reduce operation to "OR" the bitmasks of each node;
    performing a parallel prefix operation on the number of database records on each node;
    wherein the search result is a bitmask created by the all reduce operation, where each bit in the bitmask represents a record in the database and an active bit represents a record that matches the search.

11. The computer implemented method of claim 7 further comprising the steps of:
    allocating an integer vector;
    creating an integer vector value for each node based on local search results;
    performing a parallel prefix operation on the number of matching database records on each node;
    allocating search results to a results buffer;
    performing the all reduce operation on the result buffers on each node to create a complete results buffer where each node returns the actual data from the matching records from the local search, and wherein the parallel prefix operations provides a node boundary for each node in the complete results buffer.

12. A computer implemented method for searching an in-memory database on a parallel computer system comprising the steps of:
    allocating an integer vector;
    broadcasting a non-unique search key to a plurality of compute nodes, wherein the plurality of compute nodes comprise a processor, a memory and a global combining network adapter (GCNA), wherein the GCNA performs collective operations over a global combining network that connects the plurality of compute nodes in a binary tree with a parent node and child nodes, wherein each of the plurality of compute nodes is assigned a unique rank which uniquely identifies the node's location in the binary tree network for use in both point to point and collective operations in the binary tree network,
    wherein the collective operations are variations or combinations of four operations comprising broadcast operation, gather operation, scatter operation and reduce operation,
    wherein the GCNA combines data received from the child nodes with local data and passes results to the parent node, wherein the GCNA comprises an arithmetic logic unit (ALU) that operates on data in registers in the GCNA and stores the results in a results buffer;
    initiating a search on each of the plurality of nodes using the search key;

creating an integer vector value for each node based on local search results;

storing a local search result in a combining network buffer;

performing an all reduce operation on the result buffers on each node using the GCNA to create a complete results buffer where each node returns the actual data from the matching records from the local search, and wherein the parallel prefix operations provides a node boundary for each node in the complete results buffer; and wherein a contribution register and a results register connected to the ALU hold a portion of the contribution buffer and results buffer respectively.

13. An article of manufacture for searching an in-memory database on a parallel computer, the article of manufacture comprising computer program instructions disposed upon a computer recordable medium, when executed by a computer processor performs the steps of:

broadcasting a unique search key to a plurality of compute nodes, wherein the plurality of compute nodes comprise a processor, a memory and a global combining network adapter (GCNA), wherein the GCNA performs collective operations over a global combining network that connects each of the plurality of compute nodes in a binary tree with a parent node and child nodes, wherein each of the plurality of compute nodes is assigned a unique rank which uniquely identifies the node's location in the binary tree network for use in both point to point and collective operations in the binary tree network, wherein the collective operations are variations or combinations of four operations comprising broadcast operation, gather operation, scatter operation and reduce operation, wherein the GCNA combines data received from the child nodes with local data and passes results to the parent node, wherein the GCNA comprises an arithmetic logic unit (ALU) that operates on data in registers in the GCNA and stores the results in a results buffer;

initiating a search on each of the plurality of nodes using the search key;

storing a search result on each of the plurality of nodes in a contribution buffer;

performing a collective operation on the combining network buffers on the plurality of nodes using the GCNA to combine data from the child nodes with the contribution buffer and passing a result stored in a results buffer to a parent node to create a search result for searching the in-memory database for the non-unique search key.

14. The article of manufacture of claim 13 wherein the method is initiated from a service node connected to the plurality of compute nodes.

15. The article of manufacture of claim 13 wherein the arithmetic logic unit (ALU) communicates with the parent node and the child nodes and performs the all reduce operation on data in the combining network buffers and wherein a contribution register and a results register connected to the ALU hold a portion of the contribution buffer and results buffer respectively.

16. The article of manufacture of claim 13 further comprising the steps of:

allocating a bitmask;

creating a bitmask for each node;

performing an all reduce operation to "OR" the bitmasks of each node;

performing the parallel prefix operation on the number of database records on each node;

wherein the search result is a bitmask created by the all reduce operation, where each bit in the bitmask represents a record in the database and an active bit represents a record that matches the search.

17. The article of manufacture claim 13 further comprising the steps of:

allocating an integer vector;

creating an integer vector value for each node based on local search results;

performing parallel prefix operation on the number of matching database records on each node;

allocating search results to a results buffer;

performing all reduce operation on the result buffers on each node to create a complete results buffer where each node returns the actual data from the matching records from the local search, and wherein the parallel prefix operations provides a node boundary for each node in the complete results buffer.

18. The article of manufacture of claim 13 wherein the compute nodes are located in a massively parallel computer system.

* * * * *